US010803496B1

(12) United States Patent
Hopkins

(10) Patent No.: US 10,803,496 B1
(45) Date of Patent: Oct. 13, 2020

(54) SYSTEMS AND METHODS FOR IMPLEMENTING MACHINE VISION AND OPTICAL RECOGNITION

(71) Applicant: UNITED SERVICES AUTOMOBILE ASSOCIATION (USAA), San Antonio, TX (US)

(72) Inventor: John Hopkins, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/189,643

(22) Filed: Nov. 13, 2018

Related U.S. Application Data

(63) Continuation of application No. 15/132,108, filed on Apr. 18, 2016, now Pat. No. 10,157,405.

(51) Int. Cl.
    G06Q 30/02     (2012.01)
    G06Q 40/08     (2012.01)
    G06K 9/64      (2006.01)
    G06T 11/60     (2006.01)

(52) U.S. Cl.
    CPC ........... *G06Q 30/0278* (2013.01); *G06K 9/64* (2013.01); *G06Q 40/08* (2013.01); *G06T 11/60* (2013.01)

(58) Field of Classification Search
    CPC .... G06Q 30/0278; G06Q 40/08; G06T 11/60; G06K 9/64
    See application file for complete search history.

(56) References Cited

U.S. PATENT DOCUMENTS

| | | | |
|---|---|---|---|
| 7,899,823 B1 | 3/2011 | Trandal et al. | |
| 8,942,468 B1 | 1/2015 | Toshev et al. | |
| 9,589,202 B1 | 3/2017 | Wilbert et al. | |
| 9,824,453 B1 | 11/2017 | Collins et al. | |
| 9,836,793 B2* | 12/2017 | Busque | G06Q 40/08 |
| 10,504,190 B1* | 12/2019 | Patel | H04N 5/2628 |
| 2011/0085697 A1* | 4/2011 | Clippard | G06K 9/4652 382/100 |
| 2013/0304518 A1 | 11/2013 | Artinger | |
| 2015/0127430 A1* | 5/2015 | Hammer, III | G06Q 30/0623 705/7.35 |

(Continued)

OTHER PUBLICATIONS

Wang et al., "Real-time Vehicle Classification Based on Eigenface." International Conference on Consumer Eectronics, Communications and Networks, Apr. 16, 2011, pp. 4292-4295.

*Primary Examiner* — Jon Chang
(74) *Attorney, Agent, or Firm* — BakerHostetler

(57) ABSTRACT

Embodiments disclosed herein may include a system including a server configured to receive from the mobile device the digital image capturing the object, execute an object recognition protocol to identify one or more image features of the digital image, determine an identification of the object based upon the one or more features of the digital image identified by the executed object recognition protocol, generate an object profile of the object based upon one or more data records of the object stored in the system databases where each respective record containing at least one data point corresponding to a valuation of the respective object, determine a value of the data point based upon the valuation of the respective object and a characteristic of a member, and transmit to the mobile device the object profile for the object captured in the digital image.

16 Claims, 5 Drawing Sheets

(56) References Cited

U.S. PATENT DOCUMENTS

| | | |
|---|---|---|
| 2016/0180467 A1 | 6/2016 | Griffin et al. |
| 2016/0225053 A1* | 8/2016 | Romley ............. G06Q 30/0623 |
| 2018/0075495 A1* | 3/2018 | Yu ............................ G06K 9/46 |
| 2018/0089735 A1* | 3/2018 | Lenahan ............ G06Q 30/0625 |

* cited by examiner

SYSTEMS AND METHODS FOR IMPLEMENTING MACHINE VISION AND OPTICAL RECOGNITION

CROSS-REFERENCE TO RELATED APPLICATIONS

This application is a continuation of a U.S. patent application Ser. No. 15/132,108, filed on Apr. 18, 2016, which is hereby incorporated by reference in its entirety.

TECHNICAL FIELD

This application generally relates to systems and methods for implementing machine vision and optical recognition for calculating and assessing value of a product.

BACKGROUND

As more users begin to take advantage of businesses that use the internet to describe, market, sell, and deliver products and services, the performance of web sites becomes an issue of greater importance. Depending on the type of product or service that is the subject of the web-based commerce, the challenges to providing rapid or even real-time responses to consumers can be great. For example, in providing insurance product information via the web, a web site should efficiently gather consumer information and process that information to provide insurance product rate quotes.

Conventional processes for calculating an insurance rate for a product can be complicated and may require mathematical expressions that depend on detailed product information, consumer information, rating factors from look-up tables, and other relevant information. These processes become even more complicated when calculating rates for a variety of different products, e.g., automobiles, houses, watches, guns, etc., at the same time.

Mathematical expressions and data are typically encoded into the programming for an insurance product application that gathers information from a consumer and returns rate quote information and perhaps other types of information to the consumer. However, in order to efficiently and accurately calculate insurance product rates, the insurance product application may not obtain all of the product information from the users. Product information from the users may lead to an incorrect valuation of the product and subsequently to an improper insurance policy being offered for that product. Also, the process of modifying an insurance policy using the insurance product application can become cumbersome and inefficient when it is later determined that a product conduction has changed or does not match the condition originally stated by the user.

Accordingly, what is needed is a product value calculation system that is scalable and allows for efficient and accurate calculation of product rates so that they can be returned to a consumer requesting such a rate in a short amount of time or even in real-time.

SUMMARY

Disclosed herein are systems and methods intended to address the shortcomings in the art and may provide additional or alternative advantages as well. Embodiments disclosed herein may include systems and methods for implementing machine vision and optical recognition for calculating and assessing value of a product.

In one embodiment, a computer-implemented method comprises receiving, by a server, from a mobile device a digital image capturing an object; executing, by the server, instructions to identify one or more image features of the digital image; determining, by the server, an identification of the object based upon the one or more features of the digital image; generating, by the server, an object profile of the object based upon one or more data records of the object stored in one or more system databases comprising non-transitory machine-readable media configured to store one or more records of one or more objects, each respective record containing at least one data point corresponding to a valuation of the respective object, wherein the object profile stores member identifier data associated with a user of the mobile device; determining, by the server, a value of the data point based upon the valuation of the respective object and a characteristic of a member identifier data; and transmitting, by the server, to the mobile device the object profile for the object captured in the digital image.

In another embodiment, a system comprises one or more system databases comprising non-transitory machine-readable media configured to store one or more records of one or more objects, and a mobile device configured to capture a digital image of an object. The system further comprises a server configured to receive from the mobile device the digital image capturing the object. The server is further configured to execute an object recognition protocol to identify one or more image features of the digital image. The server is further configured to determine an identification of the object based upon the one or more features of the digital image identified by the executed object recognition protocol. The server is further configured to generate an object profile of the object based upon one or more data records of the object stored in the system databases where each respective record containing at least one data point corresponding to a valuation of the respective object. The server is further configured to determine a value of the data point based upon the valuation of the respective object and a characteristic of a member. The server is further configured to transmit to the mobile device the object profile for the object captured in the digital image.

In yet another embodiment, a computer program product includes a computer-usable data carrier storing a computer-readable program code embodied therein for implementing machine vision and optical recognition for calculating and assessing value of a product. The computer-readable program code includes a program instruction means for receiving, by a server, from a mobile device a digital image capturing an object. The computer-readable program code includes a program instruction means for executing, by the server, instructions to identify one or more image features of the digital image. The computer-readable program code includes a program instruction means for determining, by the server, an identification of the object based upon the one or more features of the digital image. The computer-readable program code includes a program instruction means for generating, by the server, an object profile of the object based upon one or more data records of the object stored in one or more system databases comprising non-transitory machine-readable media configured to store one or more records of one or more objects, each respective record containing at least one data point corresponding to a valuation of the respective object, wherein the object profile stores member identifier data associated with a user of the mobile device. The computer-readable program code includes a program instruction means for determining, by the server, a value of the data point based upon the valuation of the respective object and a characteristic of a member identifier data. The computer-readable program code includes a program instruction means for transmitting, by the server, to the mobile device the object profile for the object captured in the digital image.

BRIEF DESCRIPTION OF THE DRAWINGS

The accompanying drawings constitute a part of this specification and illustrate embodiments of the invention. The present disclosure can be better understood by referring to the following figures. The components in the figures are not necessarily to scale, emphasis instead being placed upon illustrating the principles of the disclosure.

DETAILED DESCRIPTION

Figure 1:
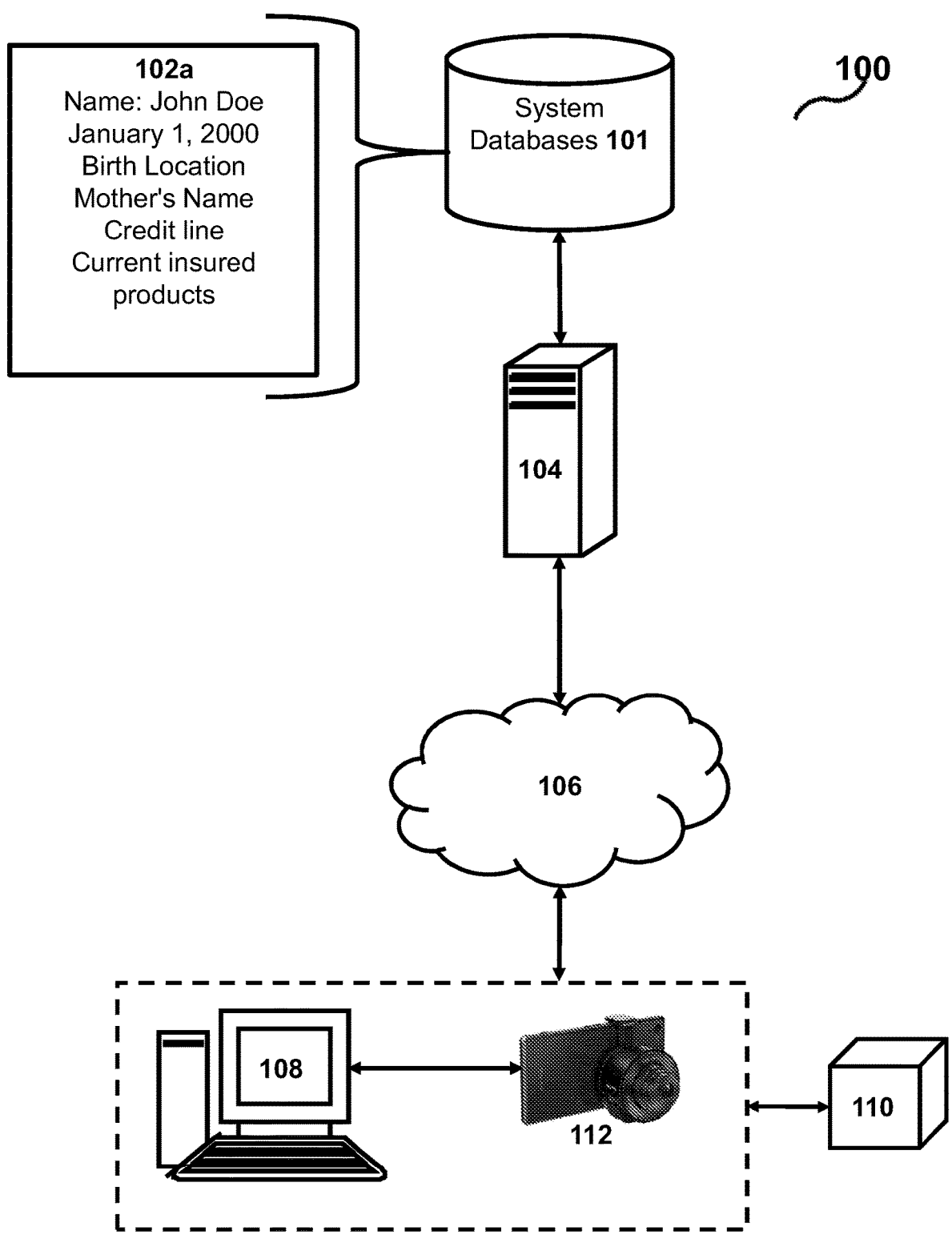
FIG. 1 shows components of an exemplary system for implementing machine vision and optical recognition for calculating and assessing value of a product, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Alterations and further modifications of the inventive features illustrated here, and additional applications of the principles of the inventions as illustrated here, which would occur to one skilled in the relevant art and having possession of this disclosure, are to be considered within the scope of the invention.

The systems and methods for implementing machine vision and optical recognition for calculating and assessing value of a product is provided where an image capture device of a mobile device captures images or video sequences of one or more products that are to be insured. The captured images of the products are pre-processed on the mobile device or may be transmitted to another device for pre-processing. The pre-processed image data obtained from pre-processing the captured images can be transmitted and transferred through a data network to servers, which then process the pre-processed image data using the algorithms and extract information from the processed image data for various applications, such as determining one or more products within the processed image data. The servers can be specially-programmed to process and analyze the captured images and extract symbolic information, such as digits, letters, text, logos, symbols or icons. The servers can be specially-programmed to facilitate the identification of the one or more products based on the information gathered from the captured image and the information available in internal and external databases. The servers are further configured to calculate the value and insurance policy plans of the one or more products recognized within the processed image data. The servers may then send information corresponding to value and insurance policy plans of the one or more products back through the network to the mobile device or to other devices, such as an administrative computer or a personal computer.

The servers may also be specially-programmed to offer various insurance services to a user of an image capture device or a mobile device comprising an image capture device or sub-component; an image capture device may include a video camera, still-image camera, a wearable device (e.g., Google Glass®), and/or other devices having a video or still-image capture component. The insurance services may be based on data gathered from images and/or video captured by the image capture device and the data available in internal and external databases. In one example, the user may want to research a coverage offered to insure real property and/or personal property, including one or more products, against damage. The user using the mobile device may perform an inspection of a room within a house, where the mobile device captures images and/or video of the products within the room. The user may transmit the captured images and/or video to a server where the server recognizes the products within the images and/or video by executing one or more object recognition techniques. The server, after recognition of the objects, may determine a value and insurance plan for each object recognized and transmit the determined data (e.g., value, existing and/or offered insurance plan corresponding to each object) to the mobile device. The user may be provided with an option to purchase an insurance plan for the respective objects.

In another example, some of the objects recognized within the images and/or video may already be insured, and in such a scenario, the server may provide an updated value and updated insurance policy plans corresponding to the previously insured objects. The server may compare data stored in the database of the previously insured objects with new data points determined corresponding to the objects in order to calculate the updated value and update insurance plans for the previously insured objects captured by the user. The systems and methods described herein are used for implementing machine vision and optical recognition for calculating and assessing value of the product captured by the user using an image capture device, such as a camera on a mobile device, and further allow the user to purchase an insurance policy online for the product on the mobile device. The systems described herein may be combined with augmented reality to file claims for the insured products. With the help of advanced augmented reality technology by adding computer vision and object recognition, the information about the surrounding real world of the user becomes digitally interactive, and the information about the environment and the product can be overlaid on the real world. The augmented reality software may display both passive and active (i.e., real-time) data. The data may be displayed over each specific product, as indicated by the user interacting with the augmented reality device (e.g., goggles), or with a user interface on a handheld device. For example, when a claim for damage to an insured vehicle is filed, the system implementing machine vision and optical recognition combined with the augmented reality overlays will identify damaged vehicle parts for vehicle repair mechanics The augmented reality view of the system will enable mechanics with general vehicle system knowledge to perform operations on the vehicle and to overlay step-by-step instructions for installing hardware such as new parts, itemizing damaged parts for computing repair cost, and for ordering new parts to replace the damaged parts. This will help capture data that may be transmitted to computing devices and systems associated with insurance investigators, claims handlers, and adjusters, which may be configured to conduct various assessments and/or valuations associated with the claim.

FIG. 1 shows components of an exemplary system 100 for implementing machine vision and optical recognition for calculating and assessing value of a product, according to an exemplary embodiment. The system 100 include one or more system databases 101, such as member profile database and image recognition database, a server 104, a network 106, an administrator computer 108, and an image capture device 112 configured to capture images of one or more products 110. The system 100 may include additional, fewer, or different components. For example, the system 100 may include additional storage devices, additional servers, additional computing devices, and other features not shown in the FIG. 1.

Devices of the system 100, such as the server 104 and the administrator computer 108, can communicate with each other and with other components of the system 100 over one or more networks 106. The networks 106 may comprise any number of electronic devices and use any number of communication protocols to facilitate data communications within the network 106. One having skill in the art would appreciate that the network 106 may include a variety of internal and/or external networks 106 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 106 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 106 may include a physical and/or logical architecture defined by firewalls, proxy servers, routers, switches, or similar features that implement various levels of security and my function as logical gateways or boundaries.

The server 104 is capable of communicating with the administrative computer 108 and the image capture device 112 through the network 106 using wired or wireless communication capabilities. The server 104 and the administrator computer 108 may be computing devices comprising any number of components, such as a Network Interface Card (NIC), allowing the respective devices to receive, transmit, process, and store information obtained from the image capture device 112. Although FIG. 1 shows only the server 104 and the administrator computer 108, the system 100 may include any number of computing devices. The system 100 may include groups or subgroups of computing devices that can communicate with each other, but not necessarily with the computing devices in other groups or subgroups. The system 100 may include computing devices of disparate types, having different types of hardware and software configurations and in a variety of different locations. In some cases, multiple devices or subsystems can be identified together as a single computing device.

The server 104 and the administrator computer 108 may include one or more processors, non-transitory machine-readable storage media, and a data communication interface (e.g., NIC card). The server 104 and the administrator computer 108 may include user interface devices, for example, a monitor, touchscreen, mouse, or keyboard. The memory of the server 104 and the administrator computer 108 may store instructions (e.g., computer code) associated with computer applications, computer programs and software modules, and other resources.

The server 104 and the administrator computer 108 can be implemented as computing devices or mobile devices, such as smart phones, personal digital assistants (PDAs), portable media players, watches, glasses, laptops, notebooks, tablets, and others. The server 104 and the administrator computer 108 can include work stations, mainframes, non-portable computing systems, devices installed in structures, vehicles, and other types of installations. The server 104 and the administrator computer 108 can include embedded communication devices.

The server 104 may further include or be associated with a specially-programmed processing unit comprising a processor (or microprocessor). The processor may control, manage, and otherwise govern the various processes, functions, and components of the system 100. The processing unit may include a single processor or a plurality of processors for configuring the system as a multi-processor system. The processor includes suitable logic, circuitry, and interfaces that are operable to execute one or more instructions to perform predetermined operations.

The processor may comprise components of any number of processor technologies known in the art. The examples of the processor may include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. The processor may also include a Graphics Processing Unit (GPU) that executes the set of instructions to perform one or more processing operations. The one or more processors of the processing unit may be configured to process and communicate various types of data (e.g., image data obtained from video cameras of the image capture device such as mobile phones). Additionally or alternatively, the processor of the processing unit may manage execution of various processes and functions of the system, and may manage the components of the system 100. In one example, the processor may process the image data captured by the video camera, to identify one or more objects within the image data.

The server 104 may include a memory that is a non-volatile storage device for storing data and instructions, to be used by the processing unit of the server 104. The memory is implemented with a magnetic disk drive, an optical disk drive, a solid state device, or an attachment to a network storage. The memory may include one or more memory devices to facilitate storage and manipulation of program code, set of instructions, tasks, and pre-stored data. Non-limiting examples of the memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. Further, the memory includes one or more instructions that are executable by the processor of the processing unit to perform specific operations. The support circuits for the processor include conventional cache, power supplies, clock circuits, data registers, I/O interfaces, and the like. The I/O interface may be directly coupled to the memory unit or coupled through the processor of the processing unit.

The administrative computer 108 of the system 110 may be any network-connectable computing device configured for displaying a user interface. The computing device can be a computer with a processor and any other electronic component that performs one or more operations according to one or more programming instructions. Examples of the computing device include, but are not limited to, a desktop computer, a laptop, a personal digital assistant (PDA), a tablet computer, mobile phone, smart phone, or the like. The administrative computer 108 is capable of communicating with the server 104 and the image capture device 112 through the network 106 using wired or wireless communication capabilities. The administrative computer 108 may also include an input unit such as a keyboard, mouse, pointer, or other input generating device to facilitate input of control instructions by the user to a processing unit of the administrative computer 108. The input unit of the administrative computer 108 may provide a portion of the user interface and include an alphanumeric keypad for inputting alphanumeric and other key information along with a cursor control device such as a mouse, a trackpad, or stylus. A display unit of the administrative computer 108 may include a cathode ray tube (CRT) display, liquid crystal display (LCD), plasma, or light emitting diode (LED) display. A graphics subsystem of the administrative computer 108 may receive textual and graphical information, and processes the information for output to the display unit.

The system databases 101 is a content library that stores data related to one or more users. The data of the user's may include name, personal details of the users, professional details of the users, current and past policy of the users, credit limit of users, among other details. The system databases 101 also stores image data in which objects may be recognized such as videos, still images, or both. For example, the system databases 101 could include a repository of user-submitted videos, such as that of Google Video or YouTube, and could also include still images, such as those indexed by Google Image Search. The images may also be obtained from online commercial image databases, photo-sharing websites, or the like. In one embodiment, each image has associated metadata, such as keywords, tags, or a textual description of the image. In some embodiments, the system databases 101 may store pre-stored image patterns and executable files associated with one or more computer vision applications (e.g., OpenCV). In such embodiments, a user device, such as a laptop, a tablet, a smartphone, or a wearable device, may execute a computer vision application that may identify the objects captured in the camera.

The image capture device 112 is a unit configured to capturing images of the one or more objects 110, storing images of the one or more objects 110 and/or sending the images of the one or more objects 110 for processing. The image capture device 112 is further capable of capturing single or multiple images or video streams of the one or more objects 110 and converting the single or multiple images or video streams of the one or more objects 110 to digital information. The image capture device 112 is equipped with the optical and electro-optical imaging components. Examples of the image capture device 112 may include a digital camera, a PDA with an internal or external camera, a cell phone with an internal or external camera, a portable computational device (e.g., laptop, palmtop or web pad-like device with an internal or external camera), a smart watch, smart glasses, or the like.

In some embodiments, the cell phone is a portable device that includes image capture functionality, such as a digital camera, and has connectivity to at least one network such as a cellular telephone network and/or the Internet. The cell phone may be a mobile telephone (cellular or otherwise), PDA, or other portable device. The camera of the cell phone captures video or frame data representative of a period of time in a scene. The video is a series of frames and associated timing information. The term video is used to refer to both a video display, i.e. the display of streamed frames, and also to video data, i.e. the digital information which may be stored or used to produce a video display. Examples of videos include files in MP4 or QuickTime format. The frame may be a single complete still image in a sequence of images that creates the illusion of motion within a scene when displayed in rapid succession (streamed). The frame may be used to refer to digital information representative of the single still image. The frames within a video may be associated with a brief period of time equal to 1/fps. The term 'fps' is an abbreviation for frames per second. Hereinafter, the term "still image," "image," and "frame" may be interchangeably used. Examples of frames include files in Joint Photographic Experts Group (JPEG), Tagged Image File Format (TIFF), Graphics Interchange Format (GIF), Windows bitmap (BMP), or Portable Network Graphics (PNG) formats.

The image capture device 112 such as a cell phone may include a microprocessor, a communication unit, random access memory (RAM), non-volatile memory, a display, one or more auxiliary input/output (I/O) devices, a data port, a keyboard, a speaker, a microphone, a short-range wireless communications subsystem, a rechargeable battery, a battery interface, and possibly other components. The image capture device 112 may include fewer, additional, or different features, which may be arranged and may operate in the manner shown or in a different manner. The cell phone is configured to be a two-way communication device having voice and data communication capabilities. The cell phone may communicate over wireless networks, including wireless telecommunication networks, wireless data networks, combined voice and data networks, or other types of wireless networks. The networks can include one or more local, regional, national, or global networks. The networks can include one or more cellular networks. In some implementations, wireless networks utilize one or more communication protocol standards, for example, 3G, 4G, GSM, CDMA, GPRS, EDGE, LTE or other.

In one embodiment, the image capture device 112 (such as a cell phone) may send and receive captured image data of the one or more objects to an external device for processing over the wireless network, for example, after wireless network registration or activation procedures have been completed. The wireless network registration or activation procedures for the image capture device 112 may vary based on the type of network or networks with which the image capture device 112 operates. Wireless network access can be associated with a subscriber or user of the image capture device 112. For example, subscribed services may include web browsing, e-mail, voice mail, Short Message Service (SMS), Multimedia Messaging Services (MMS), or others.

In another embodiment, the image capture device 112 is configured to send captured images to remote facilities such as the server 104 and/or the administrative computer 108. In one implementation, the image capture device 112 may include a data port such as a serial port, a parallel port, or another type of connection port. In some implementations, the data port is a Universal Serial Bus (USB) port or other that includes data lines for data (image data) transfer to the server 104 and/or the administrative computer 108. The image capture device 112 may be manually synchronized with the server 104 and/or the administrative computer 108, for example, by connecting the image capture device 112 through the data port that couples the image capture device 112 to the data port of the server 104, the administrative computer 108, or other device. In another implementation, the image capture device 112 may also include short-range communications system that provides for communication between the image capture device 112 and different systems or devices such as the server 104 and/or the administrative computer 108, without the use of the wireless network. For example, the short-range communications system may include an infrared or radio frequency device and associated circuits and components for short-range communication. Examples of short-range communication standards include standards developed by BLUETOOTH®, the 802.11 family of standards developed by IEEE, Near Field Communication (NFC), and others.

In yet another embodiment, the image capture device 112 may not be capable of sending captured images of the one or more objects to the server 104 and/or the administrative computer 108, and in such a situation, the image capture device 112 may transmit the captured images to a transmitting device. The transmitting device may be a device capable of transferring information to remote locations such as the server 104 and/or the administrative computer 108. The transmitting device is capable of getting the information wirelessly or using a wired connection from the image capture device 112 for pre-processing, and transmission to external devices wirelessly or using a wired connection. Examples of the transmitting device may include a wireless PDA, a web pad-like device communicating on a local wireless area network, a device communicating using infrared or acoustic energy, etc.

The image capture device 112 may include image processing algorithms and/or software's. The image processing algorithms and/or software's may also be stored in the memories of the server 104, the administrative computer 108, or other devices of the system 100 for pre-processing and processing the captured image data by the image capture device 112. In one implementation, the image processing algorithms perform compression, artifact correction, noise reduction, color corrections, geometric corrections, imager non-uniformity correction, etc., and various image processing enhancement operations on the images captured by the camera of the image capture device 112.

The image processing algorithms and/or software's may be implemented as a plurality of software objects residing on the image capture device 112, the server 104, the administrative computer 108, or other devices of the system 100. The image processing algorithms are numerical and symbolic algorithms for the manipulation of images and video streams captured by the image capture device 112. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

The image capture device 112 may also include machine learning techniques that can be used to train image capture device 112 to discriminate between features and to identify objects. The machine learning techniques may also be stored in the memories of the server 104, the administrative computer 108, or other devices of the system 100. The image capture device 112 may be trained to identify objects belonging to a specific group by providing the image capture device 112 with many training examples of objects belonging to the specific group. The image capture device 112 may be supplied with pre-made database with which to compare any new object that is later presented to the image capture device 112 during use.

The image capture device 112 may also include machine vision algorithms that perform, among other operations, digit recognition, printed and handwritten text recognition, symbol, logo and watermark recognition, and general shape recognition. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, a texture detector and edge detector may be used. If both specific texture and specific edges are detected in a set of images, then an identification may be made. One example of an edge detection method includes the Canny™ algorithm available in computer vision libraries such as Intel™ OpenCV. Texture detectors may use known algorithms such as texture detection algorithms provided by Matlab™

The image capture device 112 may include a non-volatile memory that includes erasable persistent storage, for example, flash memory, battery-backed-up RAM, or other types of memory. The non-volatile memory stores instructions and data associated with an operating system of the image capture device 112, programs (image processing algorithms and/or software) that provide various types of functionality for the image capture device 112, and other types of information. The non-volatile memory may include a file system to facilitate storage of data items on the image capture device 112. Data stored in the non-volatile memory or other computer-readable media on the image capture device 112 may include user application data, image files captured, and other data generated by the user at the image capture device 112 or received and stored by the image capture device 112.

In the exemplary embodiment illustrated in FIG. 1, the administrative computer 108 and the image capture device 112 are shown as separate devices, whereby the image capture device 112 captures an image and transmits the image or processed image data to the administrative computer 108 for further communication with the server 104. The administrative computer 108 and the image capture device 112 can be configured as a single device, such as a mobile (or cellular) phone that can capture an image, process the image, and transmit the image or image data over a network to the server 104. For example, this component can be configured as a personal computer, tablet computer, smart phone, cellular phone, smart watch, smart glasses, personal data assistant, or the like. It is intended that the embodiments described herein can be configured to operate on the administrative computer 108 and image capture device 112 or a single component incorporating functionality of both.

The processor of the server 104, the administrative computer 108, or other devices of the system 100 may execute cryptographic systems that provide secure communications services between the user of the image capture device 104 and the server 104, the administrative computer 108, or other devices of the system 100.

The system 100 uses images or video sequences captured by the image capture device 112 of the one or more objects 110, and the server 104 can decode the identity of the imaged object using the image recognition software, for example objects within a labeled product, a printed form, a page from a book or newspaper, a bill, a membership card, etc. This saves the user the time and effort of inputting the object identity and/or unique information pertaining to the object. The image capture device 112 captures images or video sequences, which may be processed on the server 104, or processed by another device, and then transmitted and transferred through a data network or networks to servers 104. The servers 104 process the captured images using the algorithms, and then use the extracted information from the processed images for various applications such as assessing the value of objects 110 recognized in the captured images for generating insurance plans of the objects 110. The servers 104 (or other connected entities) may then send information back through the network 106 to the image capture device 112, or to other devices such as a personal computer.

In the illustrated embodiment, the system databases 101 having a non-transitory machine-readable media is configured to store one or more records of the objects 110. The system databases 101 also stores profile of a member identifier data 102a associated with the user of the image capture device 112 (mobile device). The image capture device 112 captures the image of the object 110. The server 104, the administrative computer 108, or other devices of the system 100 are configured to receive from the image capture device 112 the digital image capturing the object 110. The processor of the server 104, the administrative computer 108, or other devices of the system 100 execute an object recognition protocol to identify one or more image features of the digital image and then determine an identification of the object 110 based upon the one or more features of the digital image identified by the executed object recognition protocol.

In one implementation, upon recognizing the object 110, the processor of the server 104, the administrative computer 108, or other devices of the system 100 generate an object profile of the object 110 based upon one or more data records of the object stored in the system databases 101 where each respective record contains data point corresponding to a valuation of the respective object. The object profile also stores member identifier data associated with the user of the image capture device 112 where the member identifier data includes data indicating the characteristic of the member such as previous insurance history, social security profile, etc. The processor of the server 104, the administrative computer 108, or other devices of the system 100 then determine a value of the data point based upon the valuation of the respective object and the characteristic of the member; and other details such as different insurance plans for the object. The server 104 transmits the determined information (such as different insurance plans) to the administrator computer 108 and an image capture device 112b of the user. In one preferred embodiment, the administrator computer 108 and an image capture device 112b may receive the information in coded form, that may be scanned or accessed by entering a password. For example, upon scanning of the code, the code may return a URL that the user's browser then moves to determine the details related to value and insurance plans of the object.

Figure 2:
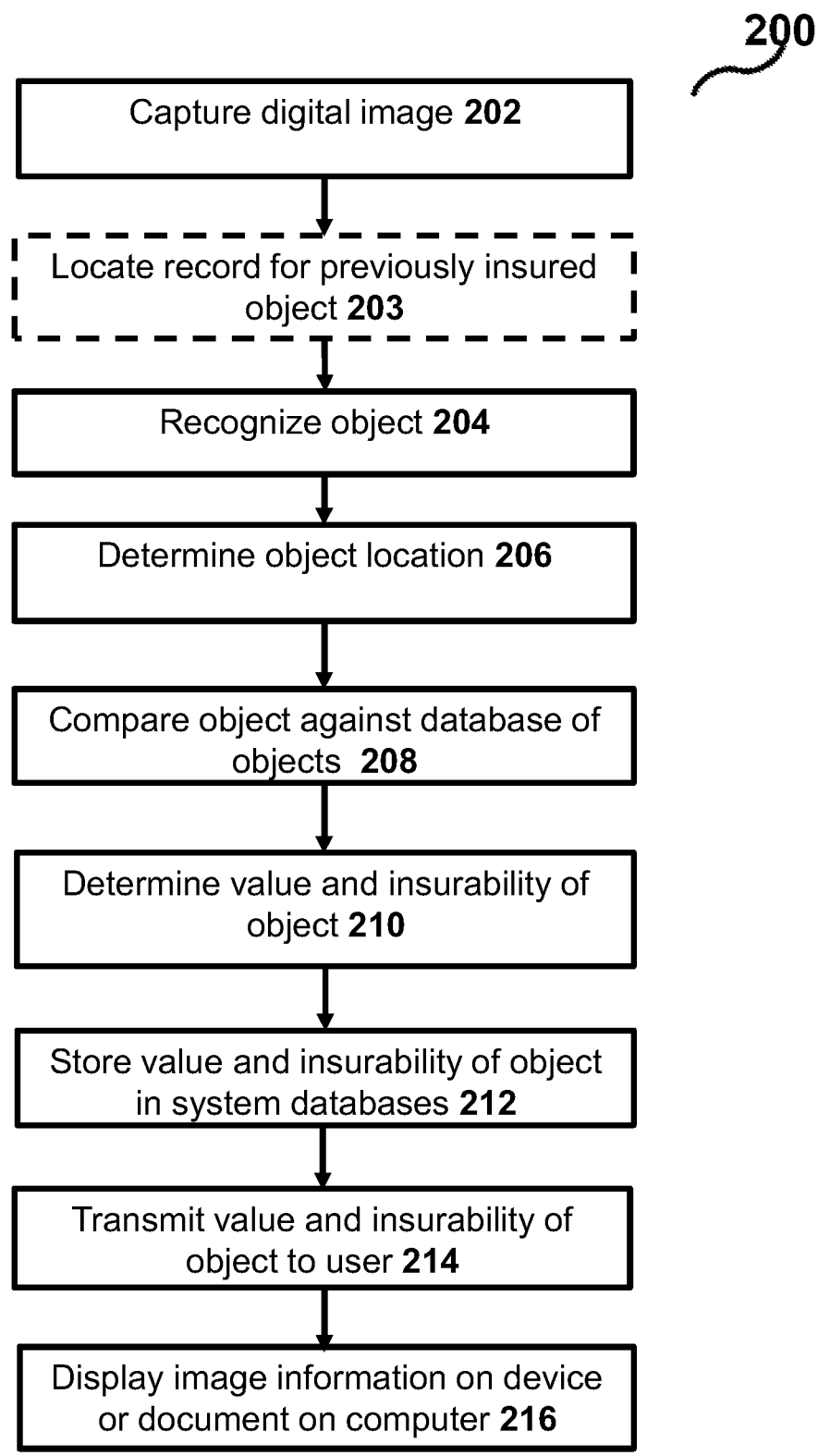
FIG. 2 shows a flow diagram of an image-based object recognition in an exemplary method for implementing machine vision and optical recognition for calculating and assessing value of a product, according to an exemplary embodiment.

FIG. 2 shows a flow diagram of an image-based object recognition process 200 in an exemplary method for implementing machine vision and optical recognition for calculating and assessing value of a product, according to an exemplary embodiment.

At step 202, an image capture device captures a digital image. In an embodiment, for image capture, a user may utilize the image capture device, such as a camera. In another embodiment, the user may utilize a computer, a mobile phone, a personal digital assistant, or other similar image capture device equipped with a camera (such as a CCD or CMOS digital camera). The user aligns the camera of the image capture device with an object of interest. The image capture process may then be initiated by suitable means including the user pressing a button on the device or camera; by the software in the device automatically recognizing that an image is to be acquired; by user voice command; or by any other appropriate means. The device captures a digital image of the object at which its lens is directed. This image is represented as three separate 2-D matrices of pixels corresponding to the raw RGB (Red, Green, Blue) representation of the input image. For the purposes of standardizing the analytical processes in this embodiment, if the device supplies the image in other than RGB format, a transformation to RGB may be accomplished. These analyses could be carried out in any standard color format, should the need arise.

The image capture device can either be a still image capture device or a video image capture device. Also, the image capture device can operate under the control of a processor to provide a constant stream of captured image information. The image capture device may also be remotely controllable such that the camera can be aimed in a preferred direction in a controlled fashion and/or to permit zoom capabilities or other selectable features such as exposure, focusing, or contrast to be used in response to remote signaling from, for example, the processor. In general, the image capture device is positioned and configured to permit capturing of images of an object featuring the entire object or pertinent portions thereof. In particular, the image capture device is oriented to permit capturing images of the object's entire body. The image can be a full front view, a full profile view, a perspective view, and so forth as desired. For a single object, numerous images may be captured to represent various views or features of the object.

The image capture device may include a buffer that can be a separate device or part of the memory. The buffer is coupled to an image processor of the image capture device, which can analyze the image in the buffer to adjust picture quality characteristics, such as speed, exposure, and the like before capturing the image in the memory. It may also be required to pre-focus the camera to assist in obtaining recognizable images. It can be accomplished by having the focusing lens of the camera always drive to a fixed focus point before attempting to take a picture or to drive the focusing lens to pre-focus the image using generalized objects in the image.

If the image processor is physically separate from the image capture device, then user captured images can be transmitted from the image capture device to the image processor using a conventional digital network or wireless network means. If the image is compressed in a manner that introduces compression artifacts into the reconstructed image, these artifacts may be partially removed by, for example, applying a conventional filter to the reconstructed image prior to additional processing. The image processor may also reduce the image data stored in an internal memory to the ones multiplied by a predetermined factor and stores the reduced image data in the internal memory. For example, the image data is reduced to the ones with lesser pixels that are a quarter in size in the horizontal and vertical direction. The image processor can reduce the image data by thinning of pixels.

In a preferred embodiment, it may be desired to store only an image representing object, for example, have the complete object on a plain, indistinct background. Some images may contain an image that is not separable from background objects. Therefore, it may be preferred to isolate the desired object in the picture to better define an image object for storage. It may be accomplished by digitally highlighting only the desired area of a photograph, cropping this highlighted area to remove the background as much as possible, and storing only the highlighted area containing the desired image object or deriving a signature defining the highlighted image region.

At optional step 203, a record of the object captured in the image is located. In an embodiment, the object captured in the image may be previously insured by the user. The user may select the record of the object from user profile comprising a list of insured objects, and send a request (comprising the record and captured image of the product) to a server to determine an updated value and updated insurance policy plans for the object. A user may desire to use the system to update stored data, and the system may capture a new image of the object to determine that it is still in the possession of the user or determine whether it is still in the same condition as when it was previously captured or identified.

At step 204, a processor of the image capture unit processes the image captured to recognize the objects within the image. The image may be a single video image frame or a series of sequential monocular or stereo image frames. In another embodiment, the image capture unit may transmit the digital image to a separate device that comprises a processor for processing the image captured to recognize the objects within the image. In yet another embodiment, the image capture unit may transmit to a server or an administrator computer that comprises a processor for processing the image captured to recognize the objects within the image.

In one embodiment, the server is linked to the mobile device through the internet, and the server receives the uploaded image. Initially, the image is input in the format of digital image data for processing by the server. The mobile device (or other device in the process) can pre-process the image to generate a pre-processed image. The image may also be normalized with respect to size and orientation. For example, if properties of the received image vary from the preferred properties, the image may be transformed to have those properties. As a further example, the actual resolution of the received image may be different than indicated in their respective file properties. In such a case, the received image would be processed to indicate their correct resolutions.

The processor may then determine if a token of an object can be detected in the image. The processor detects tokens from a group consisting of edges, contours, interest points, parts, and combinations thereof. If the token can be detected, the token is detected and stored in the memory. The processor further determines if a geometric configuration can be captured in the image. The geometric configuration of the tokens can be captured if a plurality of portions of the shape of the object can be described. If a geometric configuration can be captured, the geometric configuration is captured and stored in the memory. The geometric configuration of the tokens may be assigned to a quantization bin. The processor selects the quantization bin. The geometric configuration of the tokens are then quantized. The object is subsequently recognized by utilizing the bins as individual measurable heuristic properties of the object. The features are utilized to build object classifiers with a machine learning system. The processor then determines if an object can be detected. The object is recognized by utilizing a plurality of quantization bins as features. If the object can be detected, the details of the object may be stored in the memory.

In another embodiment, the digital image data may include an image of an object class, such as a car. If the image includes color information (for example, the object is a red color car), a color detection process may be used by the processor to increase the reliability of the object detection. The color detection process may be based on a look-up table stored in the memory that contains possible colors. The confidence values, which indicate the reliability of the object detection and are generated during bunch graph matching or by a neural network, may be increased for colored image regions.

In yet another embodiment, the processor may use a learning algorithm based on a training data set that contains many examples of objects to recognize the given object in the digital image. In one example, the learning algorithm is based on neural network approaches. In a learning phase based on a training data set, the learning algorithm constructs a classification function which can label patches in the image as either object or not. The learning algorithms may be designed and implemented using a variety of tools, CPUs, GPUs, and dedicated hardware platforms for recognition of objects within the image. Example software environments for machine learning design are Matlab (and its open source equivalent, Octave) and the combination of Python and Scipy.

In yet another embodiment, the processor may use a scanning process to enumerate all possible patches within the image. The image can contain many independent patches. Every unique location and scale in the image can yield an independent patch. The classification function is run against all such patches to detect the possible presence of an instance of the object in the patch. When the processor, through one or more classification functions, detects an object, the processor records the location and scale of the patch for later output, for example, reporting to an end-user of the administrative computer.

In yet another embodiment, the input image including a target object for recognition is entered in a feature extractor unit of the system, then the feature extractor extracts a feature from the input image and sends the feature to the processor. The processor sequentially searches models from a learning model memory. The similarity measure between the input image feature and the learning feature is calculated. The processor repeats the procedure of similarity measure calculation and output by using the model of the learning model memory. When the similarity measure is the maximum, the processor determines to which type of models the target object for recognition included in the input image belongs. The input image is overlapped with various learning images, and the overlapping degree is judged by using the similarity measure, and therefore the object matching the learning image can be recognized.

In yet another embodiment, the image may be divided into windows by the processor which preferably overlap each other. The image data within the individual windows are evaluated independently of the data of other windows. The window data is evaluated with respect to data stored in the memory of multiple feature sets representative of the object, one feature set at a time, to generate individual scores for the windows as to the likelihood that at least a portion of the object is present in the window. All of the windows of the image are evaluated with respect to the first feature set but only those windows having the highest scores as a result of this first round of evaluation, such as those over a preset level, are then evaluated with respect to the second feature set. Any subsequent evaluation with respect a third or more feature sets also process only data of windows having the highest score from the immediately preceding round of evaluation. As part of the individual window evaluations, a score results of from the evaluation of the image data with respect to the feature set data. Also as part of the individual window evaluations, relative rotation between the window image and that of the stored feature set is preferably performed. This enables detection of the object over a range of rotations with respect to the image frame.

At step 206, the processor determines object location. The recognized object location is determined by the processor based on geographical coordinates of the location where the image was captured by the image capture device that captures the object. The geographical coordinates can be generated by the image capture device and may be associated with the image data.

At step 208, the processor compares the object recognized against a system database of objects. The mobile device uploads a target image to be compared in the one or more system databases through a network connection. The method of uploading the target image from the mobile device to the server is for illustrative purposes, and as such does not limit the scope of the present invention. One with skill in the art will appreciate other methods of uploading the target image to the server can be used, so long as the essential function of providing the target image to the server is maintained.

In one embodiment, the processor compares the recognized object or objects within the target image against database of objects stored in the system databases. The system databases can store a database of records containing information representing objects based on their price in different locations, a plurality of reference images, and an object index. Each of the plurality of images and the objects stored in the system databases may be indexed and the indices of the plurality of objects may be organized in an object index. The processor can calculate a difference between the recognized object in the target image and an identified most similar object. The processor performs a search of the object index to find a most similar reference object stored to a processed target object. The processor is further configured to subtract a difference between the target object and the most similar reference object and encodes the difference between the target object and the most similar reference object. In one example, the difference between the target object and the most similar reference object may be encoded using entropy encoding. Entropy encoding is a lossless data compression scheme that measures the amount of similarity between two objects. In another example, the processor resizes the most similar reference object to the size of the target object before the difference between the target object and the most similar reference object is calculated.

In another embodiment, the processor may perform a function of determining whether or not an object similar to the target object exists within the system databases by matching a normalized feature region of objects stored in the system database to a normalized feature region of the target object. A feature point and a feature region may be extracted from the target image for the matching between the objects by the processor. The feature point refers to a point that contains a feature element of an object contained in a corresponding image, and the feature region refers to a region around the feature point containing the feature of the object. A feature extraction technique is utilized by the processor in order to extract the feature point and the feature region from the target image.

In yet another embodiment, an angle range can be established to identify matching cells, for example, an intensity angle of each cell in the target image to detect matching objects and determine the degree of similarity between a target object and a collection of objects. For example, if the intensity angle for the corresponding cell in a candidate object of the collection of objects is within the specified angle range, the two cells may be considered to be matching cells. A minimum threshold for the number of cells that must match may be specified in order to indicate matching objects, for example, 14 out of 15 matching cells may be required. In one example, finding similar objects involves calculating a similarity score for each object by summing the differences between the corresponding cells of the target object and each candidate object in the collection of objects.

At step 210, the processor can determine value and insurability of the object. The processor can appraise the value of the recognized object. The processor can execute an initial appraisal of the object or may be used to reappraise the object to validate proper insurance coverage for the object. The object may include, for example, a painting, a diamond ring, a necklace, a vehicle, a watch, a vase, furniture, memorabilia, and/or any other object of value. As used herein, the term "appraise" or "appraisal" refers to establishing a value, such as a monetary value, of the object based on characteristics of the object by the processor.

The processor evaluates multiple factors related to the object to determine the price of insuring of the object. The multiple factors may include selling price of the object in the market, cost of reconstructing the object incase of damage of the object, age of the object, and other market factors that may vary depending on the type of the object. In one example, each factor is evaluated simultaneously with all other parameters. The processor may utilize system databases that store data associated with product to calculate the insurance value of the product. The system databases may include rating information that include both consumer information (e.g., information obtained from users) and object information. Additionally, the one or more system databases used by insurance product applications can be separated from one or more dedicated rating information system databases. The system databases used, and the system databases management systems used to allow access to and control of the system databases can be based on a variety of system databases schemes, but are typically relational in nature, for example structured query language (SQL) system databases and system databases management systems.

The processor executes rating module to determine insurance product rates. The rating module can be implemented in whole or in part as software component objects (e.g., server component objects) and perform the insurance product rate calculations using rating information. Because the rating modules are implemented as software component objects, the various communication product links between rating modules and the server can be implemented as using in-process, cross-process, or remote communication. Accordingly, a variety of different rating modules can be implemented, yet all can operate in conjunction with the server. For example, the rating module, can be an in-process or cross-process component object executing on the same computer system as the server, while the rating module is a component object executing on a computer system separate from the server but located in the same facility.

When presented with the request to calculate a product rate, for example, when the user of mobile device that captured the object has requested a insurance product rate, the server provides some information requested by rating module. This information may include rating identification number, which can be unique to the particular product rate being requested, which is then used by one or more of the rating modules to access rating information from the internal and external databases. Alternately, the server can provide all of the information needed to perform the rate calculation to any of the invoked rating modules, thereby obviating the need for the rating module to have a communication link with the internal or external databases. Similarly, once a product rate is calculated by a particular rating module for the object, it is returned to the server, or written to the internal database, for later retrieval by the server.

In an embodiment, rating information database may be stored in a separate database and can itself implement one or more software component objects, and thus one or more of the rating modules can communicate with the rating information database using the previously described software component object communication schemes. The rating information database may contain information to perform a rate calculation. This information is stored as database records and can include stored procedures for calculating rates, insurance rate formulae stored as logical and algebraic expressions, one or more tables of rating factors, miscellaneous numeric values, and any other information used to calculate insurance rates for the object. Additionally, a rating module may use little or no information provided by rating information database. For example, if the rating module used is associated with a legacy rating calculation application, all of the information needed to perform the calculation could be supplied to the rating module from the server.

Figure 3:
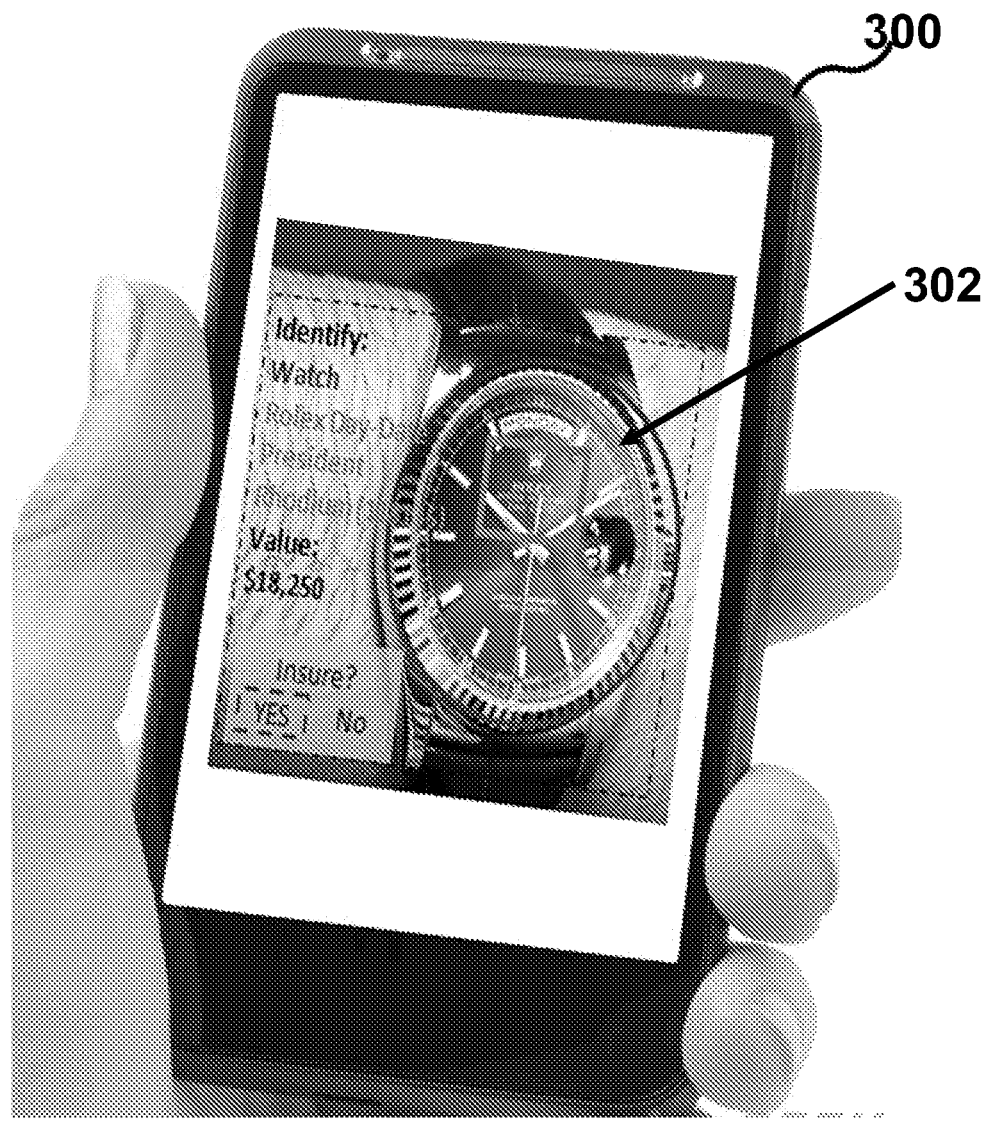
FIG. 3 shows a mobile device executing the one or more software modules described herein, where a user of the mobile device captured an image of a watch, according to an exemplary embodiment.

At step 212, the processor then stores the determined value and insurability of object in the system databases. At step 214, the processor transmits information (e.g., determined value and insurability of object) to a mobile device or computer of the user. The determined value and insurability of object may be in an encrypted message and may require to be decrypted into original text which is then displayed on the mobile device or the computing device of the user. The application installed on the mobile device or the computing device of the user may automatically compare values of the object or the product identified in the image with other vendors, and displays it to the user. At step 216, the mobile device or computing device of the user displays the value and insurability information to the user. FIG. 3 shows an example where a user captures an image of a watch 302 to be insured on a mobile device 300, according to an exemplary embodiment. In the illustrated embodiment, the user captures an image of the watch 302 from a camera of the mobile device 300. The user transmits the captured image of the watch 302 to a server to recognize the watch 302, and determine the value and insurability of the watch 302. The mobile device 300 of the user may have image processing algorithms that perform compression, artifact correction, noise reduction, color corrections, geometric corrections, imager non-uniformity correction operations on the captured image prior to sending the image of the watch 302 to the server.

The server processes the contents in the image received from the mobile device 300 to recognize objects that may have been captured in the image in order to determine the value and insurability of the objects. In the present example, only a single watch 302 is captured in the image. The server may include machine vision algorithms which are applied to recognize the details of the watch 302 captured in the image. The machine vision algorithms may include image analysis techniques that may use a feature detector or a combination of detectors such as texture detector and edge detector to recognize the watch 302. In another embodiment, the mobile device 300 may include machine vision algorithms that may include image analysis techniques to recognize the watch 302. In yet another embodiment, the mobile device 300 may transmit the image to an administrator computer that comprises a processor for processing the image captured to recognize the watch 302 within the image. For example, the mobile device may determine that a circular object has features resembling a watch face and further detect features to determine the particular watch brand, model, and value.

The processor of the server may also compare the watch 302 in the captured image against database of objects stored in the server. The processor may determine whether or not an object similar to the watch 302 in captured image exists within the server by matching a normalized feature region of objects stored in the server to a normalized feature region of the watch 302 in the captured image. A feature point and a feature region may be extracted by the processor from the watch 302 in the captured image for matching with the objects in the server. The feature point refers to a point that contains a feature element of the watch 302 contained in a captured image, and the feature region refers to a region around the feature point containing the feature of the watch 302. The processor of the server after recognizing the watch 302 within the image being Rolex watch, may then generate an object profile of the watch 302 based upon one or more data records of the Rolex watch. Each respective record contains data point corresponding to a valuation of the respective watch 302. The data records may correspond to a model number of the watch 302, an year of make of the watch 302, selling price of the watch 302 in the market, cost of reconstructing the watch 302 in case of damage of the watch, etc. The object profile of the watch 302 may also store user identifier data associated with the user of the mobile device 300. The user identifier data includes data indicating the characteristic of the user such as previous insurance history, social security profile, total insurance money pool, etc.

The processor of the server then determine a value of the watch 302 based upon the evaluation of the data points of the respective watch 302 and the characteristic of the user. Other details such as different insurance plans for the watch 302 available in the market may be taken as an input in order to determine the value and insurance plan of the watch 302. The server transmits the determined information such as value of the watch 302 and insurance plan options for the watch 302 to the mobile device 300 of the user. The determined information is displayed on the screen of the mobile device 300 of the user. In one embodiment, the mobile device 300 may receive the information in coded form, that may be scanned or accessed by entering a password. For example, upon scanning of the code, the code may return a URL that the user's browser then moves to determine the details related to value and insurance plans of the watch 302.

In the illustrated example, the value ($18,250) of the watch 302 determined by the server is displayed on the mobile device 300. The user is further provided an option to insure the watch. When the user selects "YES" option, the insurance plans available for the watch may then be displayed to the user. On accepting the insurance plan, the watch is insured and the money for insurance may be deducted from the user insurance pool. In another embodiment, the user may be requested to pay the money to buy the insurance. The selection is then transmitted to the server for processing of that request.

The server may also be programmed to offer various insurance services to the user of mobile device 300 based on data gathered from images and/or video captured by the camera of the mobile device 300 and the data available in internal and external system databases. For example, the user may want a coverage offered in property insurance to insure the entire property and one or more products (including the watch 302) within the property against damage. The user using the mobile device 300 or any suitable movable device having a camera may perform an inspection of the property by capturing images and/or video of the products including the watch 302 within the property. The user transmit the captured images and/or video to the server as described above, where the server recognizes the products such as the watch 302 within the images and/or video by using suitable object recognition techniques. The server after recognition of the objects such as the watch 302, may determine a value and insurance plan for each object recognized and transmit the determined data (value and insurance plan corresponding to each object such as the watch 302) to the mobile device 300. The user may be provided with an option to purchase an insurance plan for the respective objects.

Any suitable movable device may operate independently of user and can be remotely controlled using an inspection control station or a radio controller. The movable device can be propelled by wheels, treads, belts, chains, caterpillar tracks, legs, feet, magnetic/electric fields, air flow, or any other contact or non-contact propulsion, motion, positioning technique. The video and other images can be recorded onboard the movable device for subsequent download to another computer, or transmitted wirelessly to the server in real time during the inspection where the server performs recognition of objects captured in the videos and/or images.

In one example, the image capture and recognition system can be useful when a user desires to scan a dwelling for insurable objects. The user can use the mobile device to capture images of objects throughout one or more rooms, and the server will identify which objects may be insurable and the cost for insuring those objects. This process may be implemented in a dynamic nature, whereby the camera of the mobile device pans across an area and continuously captures images and identifies insurable objects, as opposed to requiring the user to capture a picture or select items for consideration.

Figure 4:
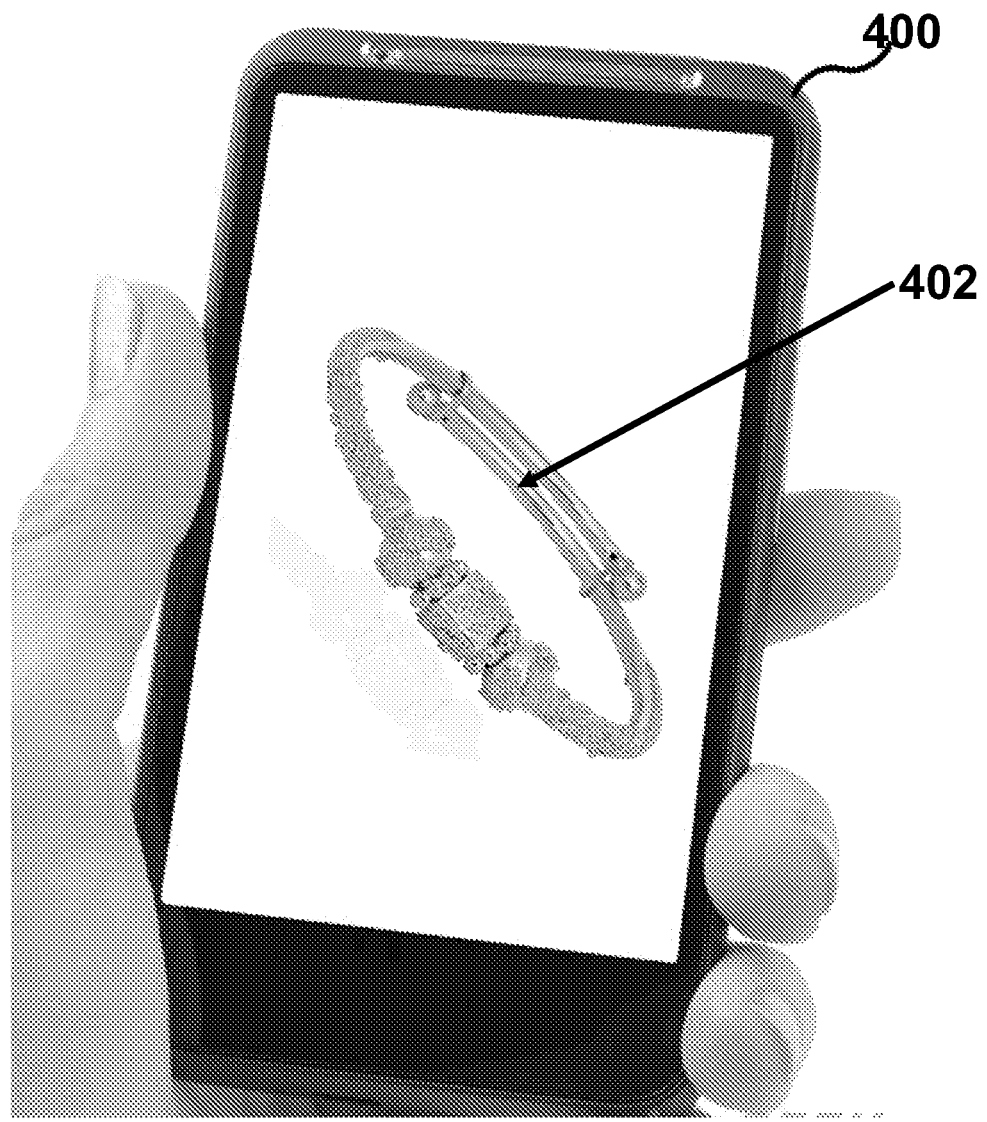
FIG. 4 shows a mobile device executing the one or more software modules described herein, where a user captured an image of a diamond ring, according to an exemplary embodiment.

FIG. 4 shows an example where a user captures an image of a diamond object 402 to be insured on a mobile device 400, according to an exemplary embodiment. In the illustrated embodiment, the user captures an image of the diamond object 402 from a camera of the mobile device 400. The diamond object 402 captured in the image is previously insured by the user. The user select a record of the diamond object 402 from user profile comprising a list of previously insured objects of the user, and send a request to a server (along with the record and the captured image) to determine an updated value of the diamond object 402 and updated insurance policy plans based on the updated value of the diamond object 402. The mobile device 400 of the user may have image processing algorithms that perform compression, artifact correction, noise reduction, color corrections, geometric corrections, imager non-uniformity correction operations on the captured image prior to sending the image of the diamond object 402 to the server.

The processor of the server processes the image received from the mobile device 400 to recognize the diamond object 402 captured in the image to determine the updated value and insurability of the diamond object 402. In one embodiment, the server may include machine vision algorithms which are applied to recognize the diamond object 402 captured in the image. The machine vision algorithms may include image analysis techniques that may use a feature detector or a combination of detectors such as texture detector and edge detector to identify the diamond object 402. In another embodiment, the processor of the server receive the record from the user regarding a previous insurance policy details of the diamond object 402. The processor may compare the diamond object 402 in the captured image with an original image of diamond object stored in the record. The processor determines the differences between the original image of the diamond object and the diamond object 402 in the captured image, and uses the differences as one of the inputs in order to calculate the update value. For example, the processor may determine if there has been any breakage or any deterioration in the diamond object 402 in comparison the previously stored data history of the diamond object 402.

The processor further generate a new object profile of the diamond object 402 based upon one or more new data records of the diamond object 402. Each respective record contains data point corresponding to a valuation of the diamond object 402. The new object profile of the diamond object 402 may also store user identifier data associated with the user of the mobile device 400. The user identifier data includes data indicating the characteristic of the user such as previous insurance policy of the diamond object 402, social security profile, total insurance money pool, etc.

The processor of the server then determine the updated value of the diamond object 402 based upon the evaluation of the of the data points of the respective diamond object 402 and the characteristic of the user. The server transmits the determined information such as the updated value of the diamond object 402 and based on the updated value, the updated insurance plan options for the diamond object 402 to the mobile device 400 of the user. The determined information is displayed on the screen of the mobile device 400 of the user.

Figure 5:
FIG. 5 shows a mobile device executing the one or more software modules described herein, where a user of the mobile device captured an image of a car, according to an exemplary embodiment.

FIG. 5 shows an example where a user captures an image of a car to be insured on a mobile device 500, according to an exemplary embodiment. In the illustrated embodiment, the user captures an image of a car from a camera of the mobile device 500. The user may transmit the captured image of the car to a server to recognize the car, and determine the value and insurability of the car. The mobile device 500 of the user may have image processing algorithms that perform compression, artifact correction, noise reduction, color corrections, geometric corrections, imager non-uniformity correction operations on the captured image prior to sending the image of the car to the server.

The server processes the image received from the mobile device 500 to recognize the car captured in the image. The server may include machine vision algorithms which are applied to recognize the car captured in the image. The machine vision algorithms may include image analysis techniques that may use a feature detector or a combination of detectors such as texture detector and edge detector to identify the car. In another embodiment, the mobile device 500 may include machine vision algorithms that may include image analysis techniques to identify the car. In yet another embodiment, the mobile device 500 may transmit the image to an administrator computer that comprises a processor for processing the image captured to recognize the car within the image. The processor of the server may also compare the car in the captured image against database of objects stored in the server. The processor may determine whether or not an object similar to the car in captured image exists within the server by matching a normalized feature region of objects stored in the server to a normalized feature region of the car in the captured image.

The processor of the server after recognizing the car within the image, locates one or more same cars (including both new and old models) available for sale within a proximal distance from location of the user. The server may obtain location information of the user's mobile device 500 or the server may obtain the physical address of the user from the database and used as a reference location. The server may then generate an object profile of the cars within the proximal distance from the reference location of the user based upon one or more data records of the cars. Each respective record of the cars contains data point corresponding to a valuation of the respective cars. The data records may correspond to model number of the cars, year of make of the cars, brand of the cars, mileage of the cars, selling price of the cars in the market, cost of reconstructing the cars incase of damage of the cars, etc. The object profile of the cars may also store user identifier data associated with the user of the mobile device 500. The user identifier data includes data indicating the characteristic of the user such as previous insurance history, social security profile, total insurance money pool, etc.

The processor of the server then determine a value of each car 502 based upon the evaluation of the data points of the respective car and the characteristic of the user. Other details such as different insurance plans for the car 502 available in the market may be taken as an input in order to determine the value and insurance plan of the car 502. The server transmits the determined information such as year of make of the car 502, model of the car 502, average miles per gallon of the car 502, brand name of the car 502, class type of the car 502, value of the car 502, financing plan options, and insurance plan options for the car 502 to the mobile device 500 of the user. The server can also identify websites or dealers that are selling a similar car and present a link (e.g., "Find . . . 1 Located") on the user interface of the mobile device 500. The determined information is displayed on the screen of the mobile device 500 of the user. The mobile device 500 may receive the information in coded form, that may be scanned or accessed by entering a password. For example, upon scanning of the code, the code may return a URL that the user's browser then moves to determine the details related to value and insurance plans of the car 502.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A method comprising:
   receiving, by a server, from an electronic device operated by a user, a digital image of an object;
   determining by the server in a database, a user record comprising an object profile of the object containing a previously stored value of the object;
   executing, by the server, a machine learning algorithm to determine one or more features of the object in the digital image, wherein the machine learning algorithm is trained based on a training dataset containing a collection of objects;
   determining, by the server, location data of a place where the digital image was captured;
   generating, by the server, one or more new data records of the object, each respective new data record containing at least one new data point corresponding to a valuation of the object;
   generating, by the server, a new object profile of the object based upon the one or more new data records of the object;
   determining, by the server, an updated value of the object based on the new object profile and the location data; and
   transmitting, by the server to the electronic device, the updated value of the object, and the new object profile.

2. The method according to claim 1, further comprising displaying, by the server on the electronic device, the updated value of the object, and the new object profile.

3. The method according to claim 1, further comprising executing, by the server, image processing algorithms on the digital image to perform color and geometric corrections on the digital image.

4. The method according to claim 1, wherein the electronic device is a mobile device of the user.

5. The method according to claim 1, wherein the machine learning algorithm executes a classification function to label patches in the digital image to determine the one or more features of the object.

6. The method according to claim 1, wherein the object profile further comprises previously captured image of the object.

7. The method according to claim 6, further comprising determining, by the server, breakage on the object by comparing the digital image against the previously captured image of the object.

8. A system comprising:
   a server configured to:
   receive from an electronic device a digital image of an object;
   identify a user record comprising an object profile of the object containing a previously stored value of the object;
   execute a machine learning algorithm to determine one or more features of the object in the digital image, wherein the machine learning algorithm is trained based on a training dataset containing a collection of objects;
   determine location data of a place where the digital image was captured;
   generate one or more new data records of the object, each respective new data record containing at least one new data point corresponding to a valuation of the object;
   generate a new object profile of the object based upon the one or more new data records of the object;
   determine an updated value of the object based on the new object profile and the location data; and
   transmit to the electronic device, the updated value of the object and the new object profile.

9. The system according to claim 8, wherein the server is further configured to display, on the electronic device, the updated value of the object and the new object profile.

10. The system according to claim 8, wherein the server is further configured to execute image processing algorithms on the digital image to perform color and geometric corrections on the digital image.

11. The system according to claim 8, wherein the object profile further comprises previously captured image of the object.

12. The system according to claim 11, wherein the server is further configured to determine breakage on the object by comparing the digital image against the previously captured image of the object.

13. A computer-implemented method comprising:
    receiving, by a server, from a mobile device operated by a user, a digital image record containing a digital image capturing a first object;
    determining, by the server, an object location of the first object based on geographical location coordinates associated with the digital image captured by the mobile device and contained within the digital image record;
    executing by the server, an object recognition protocol to identify one or more image features of the digital image;
    determining, by the server, an identification of the first object based upon the one or more image features of the digital image identified by the object recognition protocol;
    identifying, by the server, a second object within a proximal distance of the object location by comparing the first object against a database comprising an object index of records containing information representing a plurality of objects based on their value in different locations, wherein the object index includes a record of the second object;
    determining, by the server, a score between the first object and the second object by summing differences between corresponding cells of the first object and the second object;
    determining, by the server, that the score satisfies a threshold for a number of cells matching the corresponding cells of the first object and the second object;
    determining, by the server, a value of the first object based on a value of the second object and the score satisfying the threshold; and
    transmitting, by the server to the mobile device, the value of the first object.

14. The method according to claim 13, further comprising displaying, by the server on the mobile device the value of the object.

15. The method according to claim 13, further comprising executing, by the server, image processing algorithms on the digital image to perform color and geometric corrections on the digital image.

16. The method according to claim 13, further comprising:
- determining, by the server, whether there are colored image regions within the digital image; and
- upon determining presence of the colored image regions within the digital image, executing, by the server, a color detection process to identify the one or more image features of the digital image, the color detection process utilizing a look up table containing multiple colors stored in a memory.

* * * * *